United States Patent [19]
Baker

[11] 3,952,179

[45] Apr. 20, 1976

[54] ROTARY CUTTING DIE AND METHOD FOR ITS PRODUCTION

[75] Inventor: Kenneth Vincent Baker, Stillman Valley, Ill.

[73] Assignee: Rockwell International Corporation, Pittsburgh, Pa.

[22] Filed: Feb. 6, 1975

[21] Appl. No.: 547,517

Related U.S. Application Data

[62] Division of Ser. No. 467,926, May 8, 1974, Pat. No. 3,905,283.

[52] U.S. Cl. ........................ 219/69 M; 76/101 A; 93/58 R; 219/69 R; 219/69 E
[51] Int. Cl.² ................ B23P 1/08; B23K 9/16
[58] Field of Search ............ 219/69 M, 69 E, 69 V, 219/69 R; 93/58 R, 58.2 R; 76/101 A, 107 R

[56] References Cited
UNITED STATES PATENTS

| | | |
|---|---|---|
| 2,782,851 | 2/1957 | Gazette ............................. 93/58 R |
| 3,777,595 | 12/1973 | Hausermann et al. ........... 219/69 M |
| 3,796,851 | 3/1974 | Pfaff .................................. 219/69 M |
| 3,800,117 | 3/1974 | Anderson .......................... 219/69 E |

Primary Examiner—Bruce A. Reynolds

[57] ABSTRACT

An improved rotary cutting die and method of producing it are disclosed wherein a cylindrical die blank or support has a weld bead applied on its peripheral surface in a configuration corresponding to the design of the product to be formed. The weld bead is then ground to provide a working surface spaced a predetermined distance radially above the die blank surface whereupon the weld bead is electrical discharge machined to form the required cutting edges coincident with said working surface.

3 Claims, 10 Drawing Figures

ROTARY CUTTING DIE AND METHOD FOR ITS PRODUCTION

This is a division of application Ser. No. 467,926 filed May 8, 1974, now Pat. No. 3,905,283.

BACKGROUND OF THE INVENTION

Rotary, electrical discharge machined dies (EDM dies) per se have been known for some time as evidenced, for example, by U.S. Pat. Nos. 3,542,993, 3,550,479 and 3,796,851. These dies represent a significant advance in the die cutting art primarily because they can be manufactured to precise and exact dimensions by automatic, tape controlled machines, thereby eliminating any need for expensive manual operations and making it possible to reproduce exact duplicate dies whenever necessary.

Notwithstanding their obvious advantages over prior methods of making rotary dies, the present EDM dies have several inherent disadvantages. For example, the cutting edges of an average die constitute only about 10% to possibly 20% of the total surface area of the die blank. Consequently, a substantial amount of metal must be machined away from the blank surface in order to create the raised cutting edges. This not only requires a considerable amount of time for the machining operation, but it also results in a substantial amount of metal waste. Furthermore, the die cutting blanks used heretofore are not reusable. In other words, at the end of a production run or when a die becomes worn, it cannot be used to produce another die, but must be scrapped.

The excessive metal wasted during the machining operation coupled with the expense involved with scrapping the used dies constitute significant cost factors which have imposed limitations as to the types of metals which could be economically used for the die blanks.

SUMMARY OF THE INVENTION

The present invention pertains to an improved rotary cutting die and method of production which retains all of the advantageous features inherent in the known EDM dies, but which can be machined in less time with substantially less material waste and which permits the die blanks to be reused indefinitely by utilizing the method of the present invention.

In a presently preferred embodiment of the invention, a cylindrical member, which may be formed from relatively inexpensive material and which has a diameter slightly less than the pitch circle diameter of its associated drive gear, is employed as the die blank. A weld bead, preferably of a harder, more abrasive resistant alloy, is applied to the peripheral surface of the die blank in a configuration corresponding to the outline of the blank to be formed and in a manner that is peripheral surface has a diameter slightly greater than the pitch circle diameter of the die blank drive gear. The weld bead is then ground to provide a uniform peripheral surface having a diameter substantially coincident with the pitch circle diameter of the drive gear whereupon the excess weld bead material is electrical discharge machined to form the required cutting edge coincident with the pitch circle diameter of the drive gear.

By utilizing an undersize die blank with a weld bead thereon conforming to the outline of the box blanks, only a minimum of material need be machined away to form the cutting edge and thus the time required for the machining operation is substantially reduced. The reduction of waste material resulting from the machining operation, coupled with the fact that the die blanks can be recycled by grinding off the weld bead after a production run is completed, makes it economically feasible to employ harder, more abrasive resistant welding materials for the cutting edges whereby the life expectancy of the dies is materially increased.

DETAILED DESCRIPTION

With reference now to the drawings the invention pertains to a rotary die cutting cylinder for use in a conventional rotary die cutting and creasing machine wherein sheets of cardboard or the like are converted into die cut and creased carton blanks. As is well known in the art such die cutting cylinders are mounted for rotation in the spaced side frames of the cutting and creasing machine and are adapted to coact with a backing or anvil roller to cut and crease sheets of carton stock fed through the nip formed by said cylinder and roller. The die cutting cylinder normally is driven in unison with the anvil roller by means of a drive gear mounted on the journal shaft at one end thereof and thus the pitch circle diameter or radius of this gear determines the diameter of the cutting edges formed on the peripheral surface of the die cutting cylinder.

In the past, as evidenced by the aforementioned patents, it has been the practice when making electric discharge machined dies, to use hardened steel die blanks or drums having a diameter precisely equal to the pitch circle diameter of the associated drive gear. The peripheral surface of the die blank is then electrical discharge machined to leave the cutting edges in relief.

Since this procedure requires machining away approximately 80% to 90% of the surface metal to a substantial depth in order to create the raised cutting edges, considerable time is required for the machining operation and a substantial amount of waste metal is produced. Moreover, once the surface area of the die blank is thus reduced in diameter below the reference or pitch circle diameter, it cannot be recycled to form a new die, but must be scrapped at the end of a production run.

Figure 1:
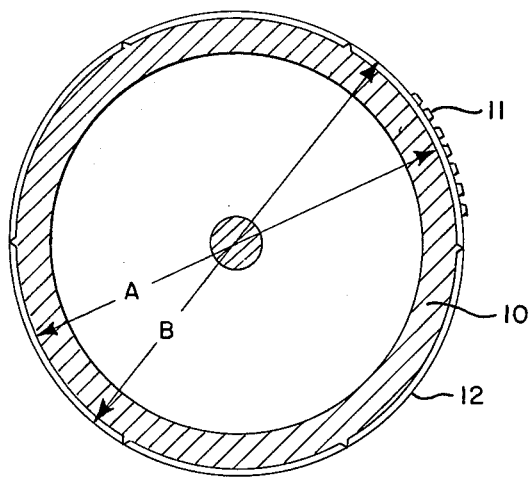
FIG. 1 is a schematic sectional view of a rotary die cutting cylinder formed in accordance with this invention.

The present invention represents a radical departure from the known procedures in that the die blanks, such as that illustrated in FIG. 1, may be formed from steel tubing of the required wall thickness and having the strength necessary to perform the die cutting function. The tubing is cut to the required length and it will be understood that end plates and journal shafts, not shown, are affixed at each end thereof to support the cylinder for rotation in suitable bearings mounted in the side frames of a die cutting and creasing machine. A drive gear having a predetermined pitch circle diameter also is secured to the journal shaft at one end of the cutting cylinder and this drive gear serves to drive the cutting cylinder in unison with a coacting anvil roller all as is well known in the art.

In accordance with the invention the die blank is formed by a length of commercially available steel tubing 10 having a diameter A that is a predetermined amount less than the pitch circle diameter B of the drive gear 11. The difference in the respective diameters is not particularly critical and may vary to suit differing circumstances but in actual practice it is preferred that the diameter of the die blank cylinder be approximately five thirty-seconds of an inch smaller than the pitch circle diameter of its drive gear.

Figure 3:
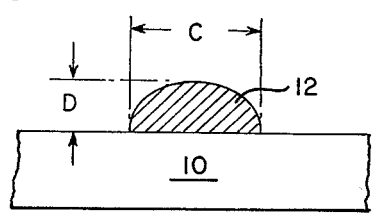
FIG. 3 is an enlarged sectional view of a fragment of the die cylinder with the rough weld bead applied thereto.

The effective diameter or radius of the die blank is then increased or built up until it actually slightly exceeds the reference diameter of the drive gear along lines coincident with the location of the cutting edges of the die to be formed. This is accomplished by applying a weld bead on the peripheral surface of the die blank as indicated at 12 in FIG. 1 and at an enlarged scale in FIG. 3. The weld bead may be applied manually in cases where a simple die configuration is involved but, as will be explained more fully hereinafter, it is preferred to employ an automatic, tape controlled machine for this purpose to insure that the weld bead will be precisely and accurately located and will conform exactly with the configuration of the cutting edges as determined by a master design layout.

The cross sectional width C and height D of the weld bead also are not critical and will depend to some extent upon the accuracy with which the bead is applied. It is merely necessary that the bead provide an adequate base from which the cutting edge can be formed and that the height thereof will be sufficient to increase the effective radius of the die blank slightly beyond the pitch circle radius of the drive gear. In actual practice, a rough weld bead having a width C of about one-fourth inch and a height D of about one-eighth inch has proved to be satisfactory.

Figure 4:
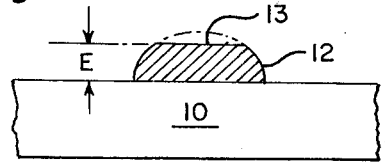
FIG. 4 illustrates the weld bead after it has been ground to provide a working surface thereon in a predetermined reference plane.

After the weld bead has been applied, the die blank is placed in a grinding machine and the peripheral surface of the weld bead is ground down to provide a uniform peripheral working surface 13, see FIG. 4, which is at a predetermined distance E above the surface of the die blank cylinder and is substantially coincident with the reference or pitch circle diameter B of the drive gear.

Figure 7:
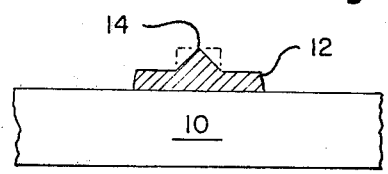
FIGS. 6, 7 and 8 illustrate creasing, cutting and cut-scoring edges, respectively, formed by the final machining operation.

Thereafter, the die blank is electrical discharge machined to remove the excess weld bead material and to form a cutting edge 14, see FIG. 7, coincident with the reference diameter or pitch circle diameter of the drive gear.

Figure 5:
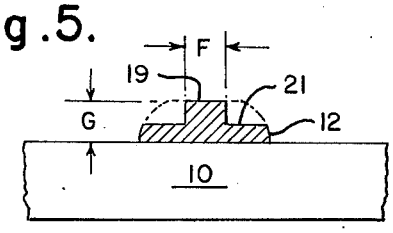
FIG. 5 illustrates the outline of the weld bead after a preliminary, rough machining operation.
Figure 9:
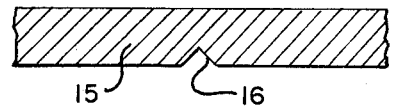
FIGS. 9 and 10 are fragmentary sectional views of a finish machining electrode and a rough machining electrode, respectively.
Figure 10:
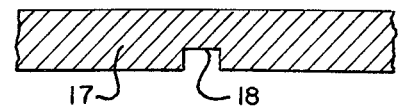

Although the electrical discharge machining operation may be accomplished in one step by using a negative electrode 15, FIG. 9, having an inverted V shaped groove 16 machined in its surface and adapted to form a finished cutting edge, it has been found that the overall machining time can be substantially reduced by employing a two step procedure. In such case a rough cut electrode 17 having a rectangular groove 18 in its surface, see FIG. 10, is used in a preliminary machining step to rapidly remove the major portion of the excess weld bead and leave a rectangular, flat, topped rib 19, see FIG. 5, with reduced diameter, laterally projecting shoulders 21 at the base thereof to reinforce and securely anchor the bead in position. The width F of the rib 19 is preferably reduced to about .040 inch and the distance G that the shoulders 21 are reduced below the working surface 13 should be about .050 inch.

The die blank is then machined a second time with the finishing electrode 15 to remove the remaining excess material from the sides of the rib 19 and form the inverted V shaped cutting edge 14 as shown in FIG. 7 with the sidewalls thereof inclined at about 30°.

Figure 6:
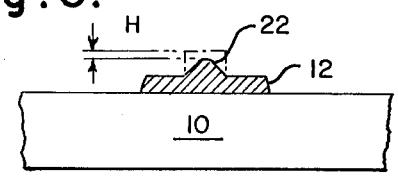

While the description thus far has been directed primarily to the formation of cutting edges about the periphery of the die blank, it should be understood that other types of working edges can be produced during the final machining operation simply by modifying the grooves of the finishing electrode. For example, FIG. 6 illustrates a creasing edge 22 which functions in conjunction with coacting grooves on the anvil roller to impart creases to the box blanks along predetermined lines to thereby facilitate folding of the carton flaps or the like. Such edges are not intended to cut the box blanks and therefore are rounded off on a small radius and are located below the reference diameter by an amount H which is substantially equal to the thickness of the stock being processed.

Figure 8:
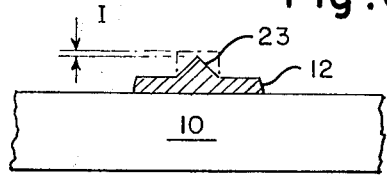

Cut-scoring edges 23, as illustrated in FIG. 8, are also employed in the manufacture of certain types of box blanks to facilitate folding. In this case, however, the cut-scoring edges 23 are adapted to cut partially through the blanks and thus have sharp edges corresponding to the cutting edges but the are located below the reference diameter by an amount I which is substantially equal to one-half the thickness of the carton stock.

From the description thus far it will be evident that dies manufactured in accordance with this invention can be readily adapted to perform any and all cutting, creasing and scoring functions. Moreover, because the fabricating procedures substantially reduce the amount of waste, combinations of materials can be utilized whereby the cost of the dies is reduced and the normal life expectancy is greatly increased. For example, because the die blank per se is not utilized to provide anything more than a supporting function, relatively inexpensive, commercially available steel tubing can be used. Moreover, because the amount of material required for the cutting, creasing and scoring edges is minimal, it is economically feasible to use more expensive, longer wearing, abrasive resistant materials such as cobalt based tungsten carbide or the like for forming the bead to thereby enhance the life expectancy of the dies.

Figure 2:
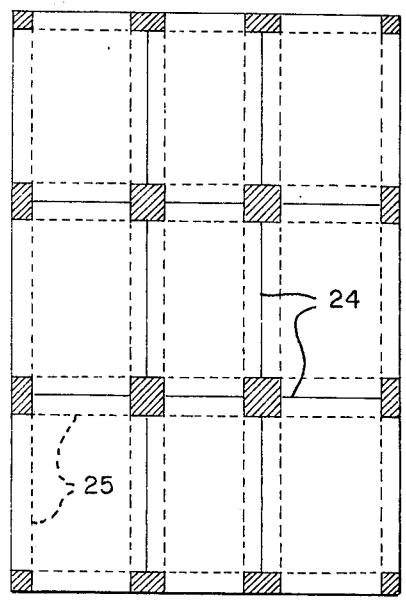
FIG. 2 is a typical design layout for a sheet of carton blanks to be produced.

Although the improved rotary die can be fabricated in various ways, there follows a brief description of a preferred procedure. A precision design layout is first prepared wherein the location and configuration of the cutting, creasing and/or score lines are clearly shown. FIG. 2 illustrates a simple example of such layout wherein the outline of the box blanks and thus the cutting edges to be formed in the die are represented by solid lines 24 and the creasing or score lines are indicated by the broken lines 25.

The design layout should be accurately prepared because information obtained therefrom is fed into a properly programmed computer which, in turn, produces a control tape suitable for controlling the automatic machines used to form the electrical discharge machining electrodes 15 and 17 as well as to apply the weld beads on the surface of the die blank.

Upon completion of the control tape, the assembled die blank cylinder 10 is placed in a machine having means responsive to the tape for rotating and translating the die blank relative to a welding head and a weld bead of an appropriate alloy is applied to the surface of the die blank along lines corresponding precisely to the design layout.

The same control tape is then utilized to control a similar machine to produce the electrical discharge machining electrodes. The first or rough cut electrode 17 is routed with a tool adapted to form a rectangular groove 18 therein conforming to the configuration of the design layout and which serves to machine the weld bead 12 to the shape of the rib 19 illustrated in FIG. 5. The second or finishing electrode 15 is then formed under control of the same tape. In this case, however, the tool used is adapted to form an inverted V groove 16 in the electrode which serves to machine the rib 19 to the finished cutting edge 14 shown in FIG. 7.

It will be understood that where a die is comprised entirely of cutting edges, one and the same tape can be used for the welding step as well as to fabricate both the rough and finishing electrodes. If a die includes creasing and/or scoring sections in addition to cutting edges, however, a modified tape is required to process the finishing electrode. This is necessary to provide for changing the routing tool at appropriate intervals to produce crease or score forming grooves in the required locations.

Upon completion of the electrodes, the rough cut electrode 17 and the die blank are mounted in the tank of an electrical discharge machine and the weld bead is rapidly machined to the shape of the rib 19. Thereafter the rough cut electrode is replaced by the finishing electrode 15 and a final machining operation is performed to provide the creasing, cutting and/or cut-scoring edges as illustrated in FIGS. 6, 7 and 8, respectively.

While the disclosure hereinabove has been directed to a preferred embodiment of the invention and the procedure for fabricating same, modifications of the die as well as in the method of fabricating it will become apparent to those skilled in the art. For example, although the concept is particularly advantageous in connection with the fabrication of cylindrical, rotary dies, it can be utilized with advantage in the manufacture of flat dies for platen type or flat bed presses. It is also contemplated that either flat or cylindrical electrodes can be employed to produce either flat or cylindrical dies and that the machining operation can be performed in one step with only a finishing electrode if such is preferred.

It also should be understood that, for convenience, the invention has been illustrated and described in conjunction with a rotary die adapted to be driven by a conventional drive gear and therefore the diameter of the die cylinder is directly related to the pitch circle diameter of the drive gear. This is not to be regarded as a limitation, however, because the die cylinder may be driven by other means.

The important feature of the invention resides in the fact that, for a given product size, an undersize die blank is employed. The effective diameter of the die blank is then increased to the required size by the application of the weld bead which in turn is electrical discharge machined to provide cutting edges of precisely the required diameter.

I claim:

1. The method of making a rotary cutting die for converting sheet material into die cut and creased products comprising the steps of:
providing a die blank cylinder having a diameter less than a predetermined reference diameter,
applying a weld bead to the peripheral surface of the die blank cylinder in a predetermined configuration to increase the effective diameter of the die blank cylinder beyond the reference diameter,
removing a portion of the weld bead to form a uniform working surface thereon having a diameter equal to said reference diameter,
and electrical discharge machining said weld bead to form a cutting edge coincident with said working surface.

2. The method as set forth in claim 1, wherein the electrical discharge machining is preceded by the step of forming a negative electrode having a groove therein corresponding to said predetermined configuration.

3. The method as set forth in claim 1 wherein the electrical discharge machining consists of the steps of first electrical discharge machining the weld bead with a rough cut electrode to rapidly remove the excess weld bead material and then electrical discharge machining the weld bead a second time with a finishing electrode to form the cutting edge.

* * * * *